(12) United States Patent
Yoo et al.

(10) Patent No.: US 11,171,340 B2
(45) Date of Patent: Nov. 9, 2021

(54) UNIT CELL FOR FUEL CELL

(71) Applicants: Hyundai Motor Company, Seoul (KR); Kia Motors Corporation, Seoul (KR)

(72) Inventors: Jin Hyeok Yoo, Cheonan-si (KR); Byeong-Heon Jeong, Seoul (KR); Seong Il Heo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 46 days.

(21) Appl. No.: 16/869,971

(22) Filed: May 8, 2020

(65) Prior Publication Data

US 2021/0135253 A1 May 6, 2021

(30) Foreign Application Priority Data

Oct. 30, 2019 (KR) ........................ 10-2019-0136993

(51) Int. Cl.
| | |
|---|---|
| *H01M 8/0265* | (2016.01) |
| *H01M 8/0273* | (2016.01) |
| *H01M 8/1004* | (2016.01) |
| *H01M 8/242* | (2016.01) |
| *H01M 8/2483* | (2016.01) |
| *H01M 8/1018* | (2016.01) |

(52) U.S. Cl.
CPC ....... *H01M 8/0265* (2013.01); *H01M 8/0273* (2013.01); *H01M 8/1004* (2013.01); *H01M 8/242* (2013.01); *H01M 8/2483* (2016.02); *H01M 2008/1095* (2013.01)

(58) Field of Classification Search
None
See application file for complete search history.

(56) References Cited

U.S. PATENT DOCUMENTS

| | | | |
|---|---|---|---|
| 2002/0172852 A1 | 11/2002 | Frank et al. | |
| 2012/0178011 A1 | 7/2012 | Sugiura et al. | |
| 2014/0017582 A1* | 1/2014 | Hashimoto | H01M 8/0247 429/414 |

(Continued)

FOREIGN PATENT DOCUMENTS

| | | |
|---|---|---|
| JP | 5236024 B2 | 7/2013 |
| JP | 2017212126 A | 11/2017 |

(Continued)

*Primary Examiner* — Haroon S. Sheikh
(74) *Attorney, Agent, or Firm* — Slater Matsil, LLP (57) ABSTRACT

A unit cell for a fuel cell is provided. The unit cell includes an insert including a Membrane-Electrode Assembly having a first pair of electrode layers formed on a first surface of a polymer electrolyte membrane and a second pair of electrode layers formed on a second surface of the polymer electrolyte membrane, an elastomer frame bonded at a rim of the insert in an outer area of the insert, the elastomer frame having a reaction surface through-hole in which the insert is disposed formed therein and having a plurality of frame manifold through-holes, through which a reactant gas can flow or be discharged, formed at both sides of and spaced apart from the reaction surface through-hole, and a pair of separators, each separator disposed on a respective side of the insert and the elastomer frame.

16 Claims, 4 Drawing Sheets

(56) References Cited

U.S. PATENT DOCUMENTS

| | | | |
|---|---|---|---|
| 2015/0104729 A1* | 4/2015 | Ishida | H01M 8/241 |
| | | | 429/483 |
| 2017/0012301 A1 | 1/2017 | Kraft et al. | |
| 2017/0194658 A1 | 7/2017 | Jin et al. | |
| 2018/0026291 A1 | 1/2018 | Okada et al. | |

FOREIGN PATENT DOCUMENTS

| | | | |
|---|---|---|---|
| KR | 20030089726 A | 11/2003 | |
| KR | 101714295 B1 | 3/2017 | |
| KR | 20180011716 A | 2/2018 | |

* cited by examiner

UNIT CELL FOR FUEL CELL

CROSS-REFERENCE TO RELATED APPLICATIONS

This application claims priority to Korean Patent Application No. 10-2019-0136993, filed on Oct. 30, 2019, which application is hereby incorporated herein by reference.

TECHNICAL FIELD

The present disclosure relates to a unit cell for a fuel cell.

BACKGROUND

A fuel cell is a type of power generation device for converting chemical energy contained in fuel into electrical energy by electrochemically reacting it in a stack, and not only may supply driving powers for industrial applications, homes, and vehicles, but also may be used to supply power to a compact electronic product such as a portable device. In recent years, its use area is gradually expanded to a high efficiency clean energy source.

A unit cell of a typical fuel cell has a Membrane-Electrode Assembly (MEA) positioned at the innermost side, and the Membrane-Electrode Assembly is composed of a polymer electrolyte membrane capable of transporting a hydrogen proton and a catalyst layer applied on both surfaces of the polymer electrolyte membrane so that hydrogen and oxygen may react, that is, a cathode and an anode.

Further, a pair of separators for supplying the reactant gas and discharging the water generated by the reaction is disposed on one surface and the other surface of the Membrane-Electrode Assembly, that is, the outer portion where the cathode and the anode are positioned. At this time, a Gas Diffusion Layer (GDL) for diffusing or smoothing the flow of the reactant gas and the generated water may be interposed between the Membrane-Electrode Assembly and the separator.

Meanwhile, conventionally, a Membrane-Electrode-Gasket Assembly (MEGA) that integrates a Membrane-Electrode Assembly and a gasket has been also manufactured and used for maintaining the airtightness of the unit cell and convenience in the laminating process.

Further, in recent years, an integrated frame that integrates an insert, which bonds a gas diffusion layer to a Membrane-Electrode Assembly, and a gasket has also been proposed.

However, the conventional integrated frame has bonded the frame and the insert of a plastic material by using an adhesive. Further, if the unit cell is manufactured by using the conventional integrated frame, an adhesive member and a sealing member have been separately required for adhering the separator and the integrated frame. This process has increased the material cost and the manufacturing cost.

Therefore, in recent years, a study has been made on an elastomeric cell frame for a fuel cell and a unit cell using the same, which integrally bond a Membrane-Electrode Assembly and a gas diffusion layer without a separate adhesive member by using a sheet-shaped elastomer frame made of a Thermo Plastic Elastomer (TPE).

The elastomeric cell frame has an elastomer frame having elasticity and a separator of a metal material laminated, and the inlet and outlet through which the reactant gas flows are prepared between the elastomer frame and the separator.

However, in the case where a plurality of unit cells are laminated to form a fuel cell stack, the unit cells are laminated while being compressed therebetween, and at this time, there has occurred a problem in that the elastomer frame having elasticity in the inlet and outlet areas through which the reactant gas flows is compressed by the separator of the metal material, thereby narrowing or blocking the inlet and the outlet.

Further, there has also occurred a problem in that the elastomer frame is compressed in an undesired shape, thereby not securing the airtightness between the elastomer frame and the separator.

The foregoing explained as the background is intended merely to aid in the understanding of the background of the present disclosure, and is not intended to mean that the present disclosure falls within the purview of the related art that is already known to those skilled in the art.

SUMMARY

The present disclosure relates to a unit cell for a fuel cell. Particular embodiments of the present disclosure provide a unit cell for a fuel cell, which may secure the airtightness while at the same time stably securing the inlet and outlet of the reactant gas in a unit cell in which an elastomer frame and a metal separator are laminated.

A unit cell for a fuel cell according to an embodiment of the present disclosure includes, as the unit cell for the fuel cell, an insert including a Membrane-Electrode Assembly having a pair of electrode layers formed on both surfaces of a polymer electrolyte membrane, an elastomer frame formed in a sheet shape and bonded while being thermal bonded at the rim of the insert in the outer area of the insert, having a reaction surface through-hole in which the insert is disposed formed therein, and having a plurality of frame manifold through-holes through which the reactant gas flows or is discharged formed at both sides of the reaction surface through-hole. The unit cell for the fuel cell further includes a pair of separators disposed on one surface and the other surface of the insert and the elastomer frame to supply the reactant gas, and at least any one surface of one surface and the other surface of the elastomer frame is formed in plural with a plurality of flow path parts through which the reactant gas flows between at least any one of the frame manifold through-holes and the reaction surface through-hole to be spaced apart from each other. The separator is formed with a tunnel-shaped forming part through which the reactant gas flows while overlapping the flow path part.

The flow path part formed in the elastomer frame is formed with a step part at the height corresponding to the thickness of the separator, and the forming part of the separator is seated in an area having a relatively low height with respect to the step part of the flow path part.

The surface height of the forming part formed on the separator is formed to correspond to the height of an area having a relatively high height with respect to the step part of the flow path part.

The elastomer frame has a protrusion formed between the flow path parts adjacent to each other, and the separator has a mounting part overlapping the protrusion formed between the forming parts adjacent to each other.

The width of the protrusion formed in the elastomer frame is formed smaller than the width of the mounting part formed in the separator to be formed so that the outside surface of the protrusion and the inside surface of the mounting part, which face each other, are spaced at a predetermined interval apart from each other.

The length of the protrusion formed in the elastomer frame is formed longer than the length of the forming part formed in the separator.

The forming part of the separator is formed to be bent while being protruded in one surface direction of the separator, a flow path hole for communicating from the other surface area of the forming part to one surface area of the separator adjacent to the area where the forming part has been formed is formed, and the reactant gas flows from the other surface area of the forming part into the insert through the flow path hole.

The surface opposite to the surface, on which the elastomer frame faces the separator, of both surfaces of the elastomer frame is formed with at least one protrusion seal for surrounding the insert along the outer area of the insert, and the protrusion seal is formed in an area comprising a position corresponding to a position where the forming part of the separator has been formed.

According to an embodiment of the present disclosure, it is possible to form the forming part capable of forming the flow path through which the reactant gas flows in the separator of the metal material, and to form the flow path part in which the forming part of the separator is seated in the elastomer frame, thereby stably securing the flow path through which the reactant gas flows.

Further, it is possible to form the protrusion between the flow path parts in the elastomer frame, to form the mounting part between the forming parts in the separator, and at this time, to form the width of the protrusion to be smaller than the width of the mounting part, thereby forming the surface pressure well when the elastomer frame and the separator are compressed while being laminated.

Therefore, it is possible to prevent the forming part of the separator from being deformed while preventing the elastomer frame from being deformed while being compressed in an undesired shape, thereby stably securing the flow path through which the reactant gas flows while securing the airtightness between the elastomer frame and the separator.

Further, it is possible to form the protrusion formed on the elastomer frame to be longer than the forming part of the separator, thereby evenly inducing the reactant gas in the desired direction.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF ILLUSTRATIVE EMBODIMENTS

Hereinafter, an embodiment of the present disclosure will be described in more detail with reference to the accompanying drawings. However, the present disclosure is not limited to the embodiments disclosed below, but will be implemented in various forms, and only the embodiments are intended to complete the disclosure of the present disclosure, and are provided to fully inform those skilled in the art of the scope of the disclosure. The same reference numerals denote the same elements in the drawings.

Figure 1:
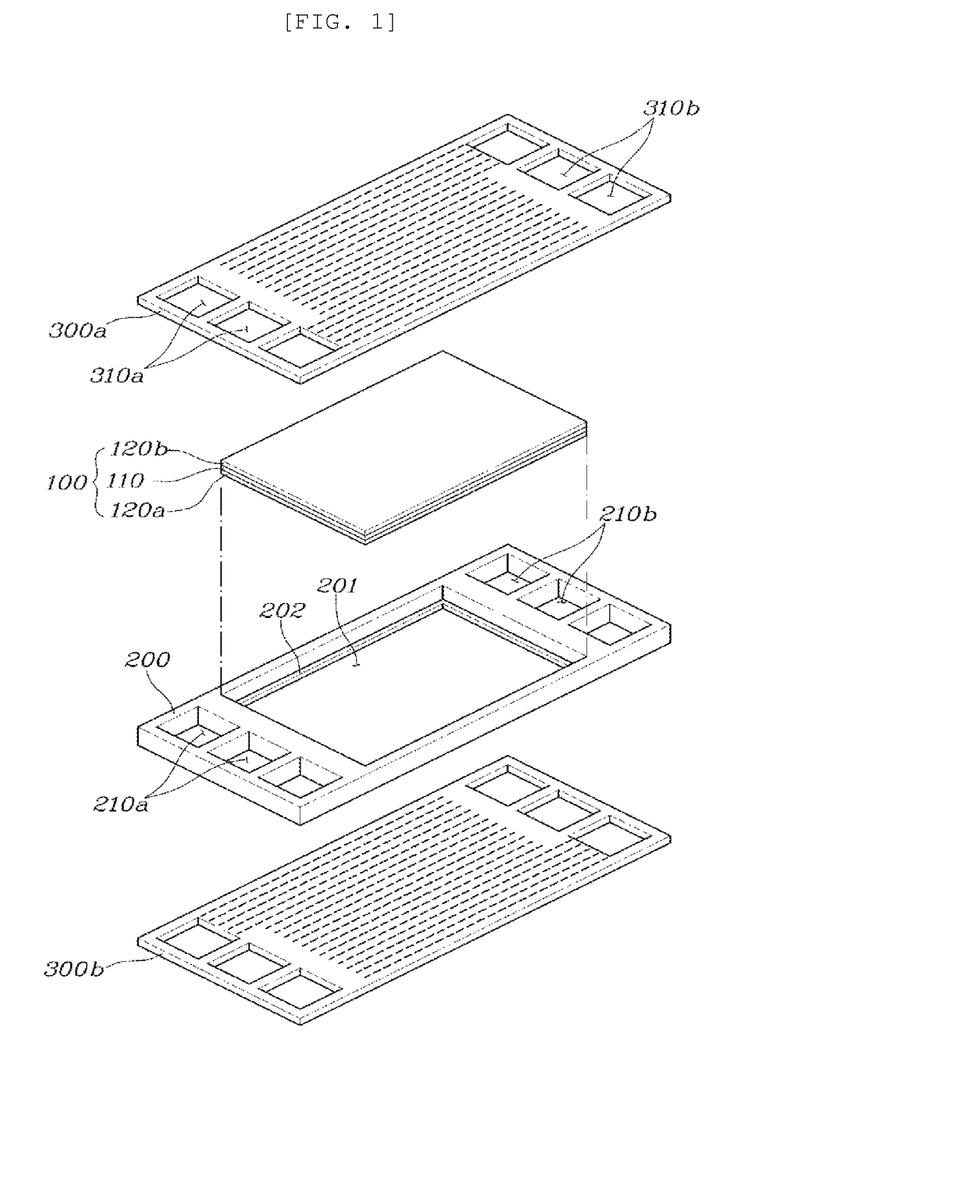
FIG. 1 is a diagram illustrating a unit cell for a fuel cell to which a general elastomeric cell frame is applied.
Figure 2:
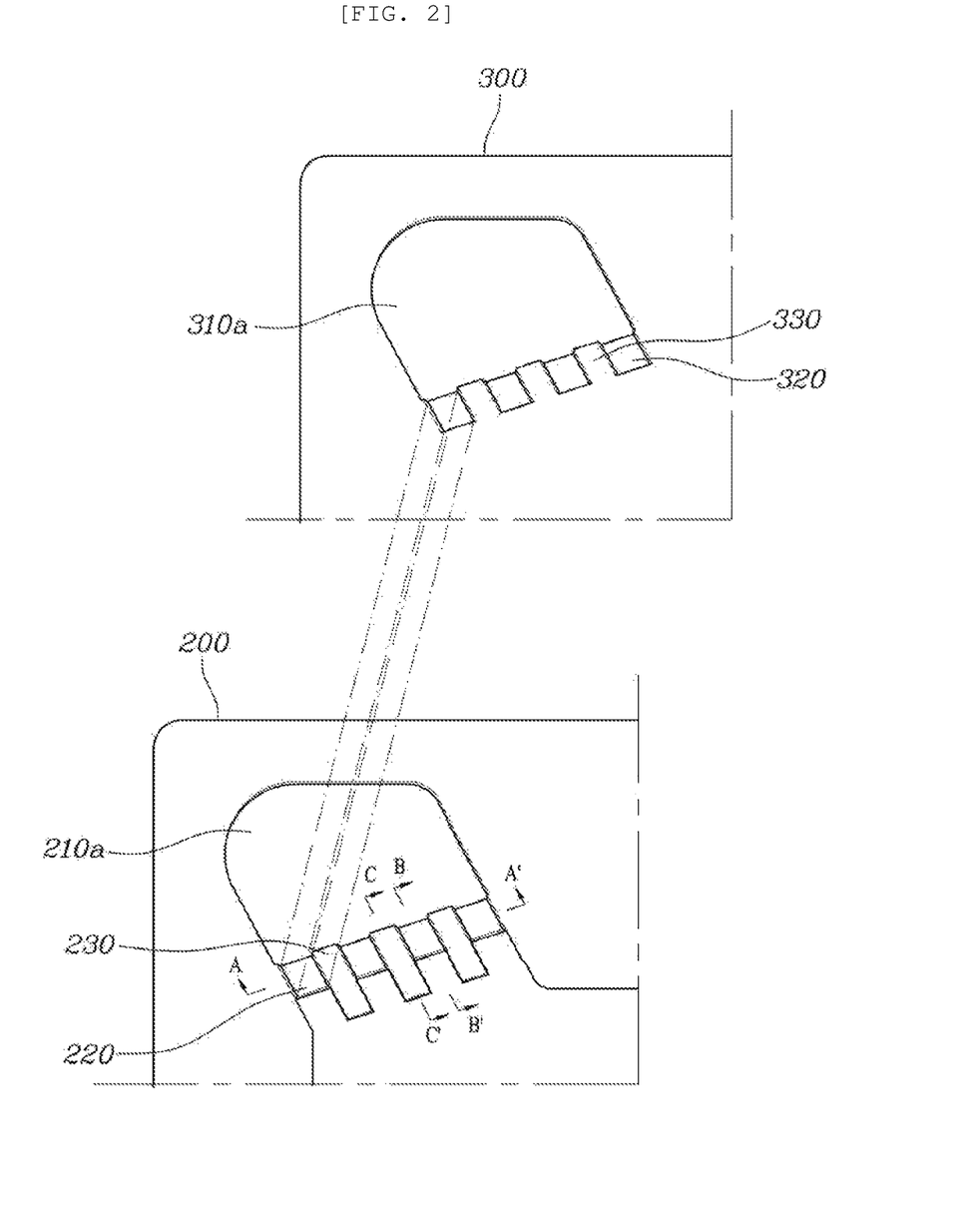
FIG. 2 is a diagram illustrating the main parts of the unit cell for the fuel cell according to an embodiment of the present disclosure.
Figure 3A:
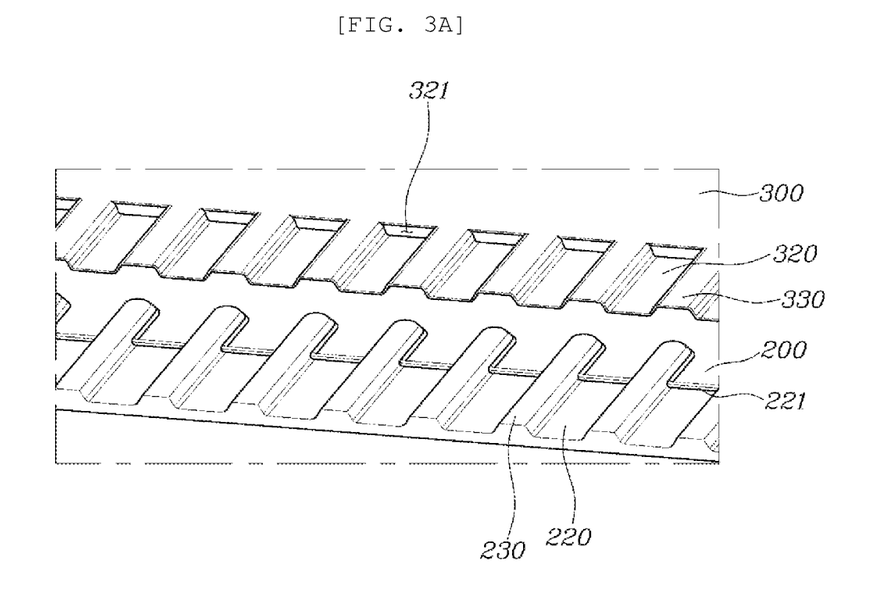
FIGS. 3A and 3B are diagrams illustrating before and after laminating the unit cell for the fuel cell according to an embodiment of the present disclosure.
Figure 3B:
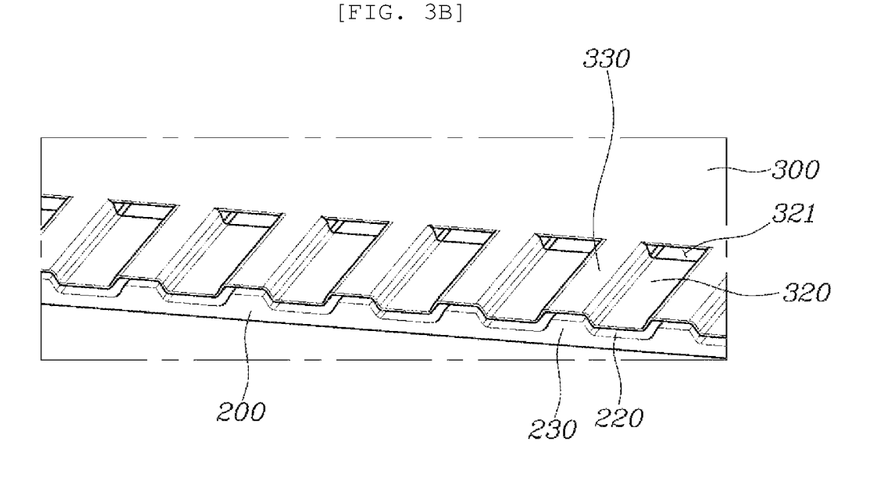
Figure 4A:
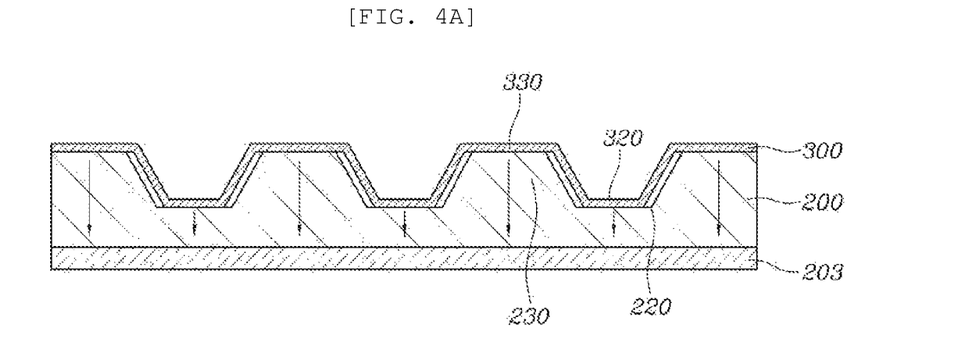
FIGS. 4A to 4C are diagrams illustrating the cross sections of the main parts of the unit cell for the fuel cell according to an embodiment of the present disclosure.
Figure 4B:
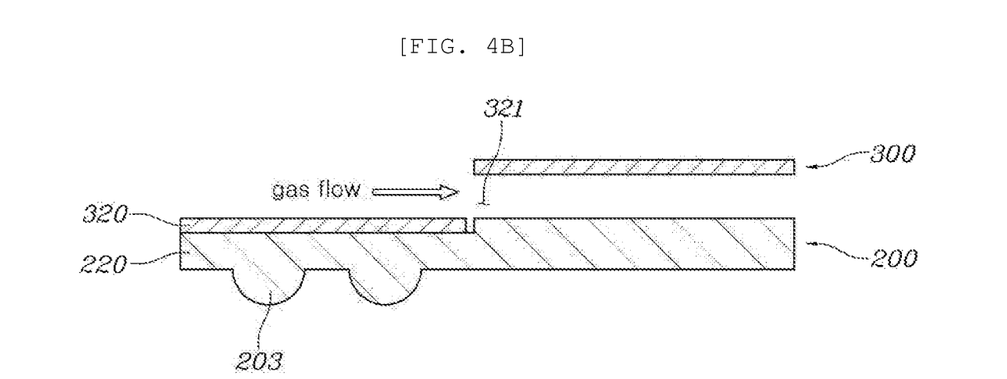
Figure 4C:
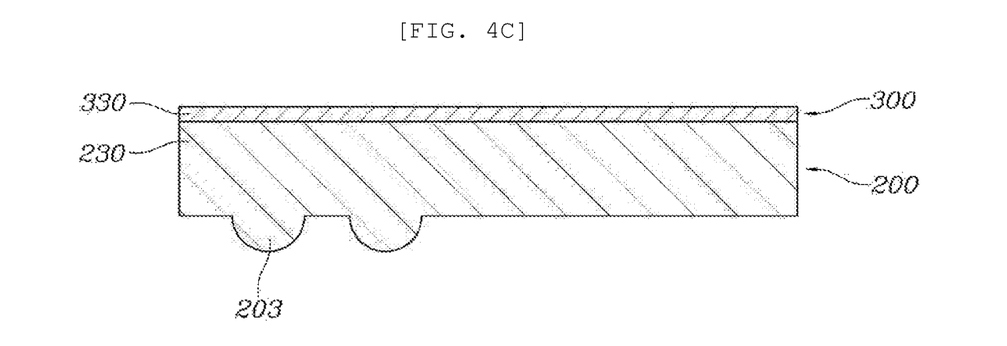

FIG. 1 is a diagram illustrating a unit cell for a fuel cell to which a general elastomeric cell frame is applied, FIG. 2 is a diagram illustrating the main pails of the unit cell for the fuel cell according to an embodiment of the present disclosure, FIGS. 3A and 3B are diagrams illustrating before and after laminating the unit cell for the fuel cell according to an embodiment of the present disclosure, and FIGS. 4A to 4C are diagrams illustrating the cross sections of the main parts of the unit cell for the fuel cell according to an embodiment of the present disclosure.

FIG. 4A is a cross-sectional diagram taken along the line A-A' in FIG. 2, FIG. 4B is a cross-sectional diagram taken along the line B-B' in FIG. 2, and FIG. 4C is a cross-sectional diagram taken along the line C-C' in FIG. 2.

As illustrated in the drawings, a unit cell for a fuel cell according to an embodiment of the present disclosure includes an insert 100 including a Membrane-Electrode Assembly 110 in which a pair of electrode layers is formed on both surfaces of a polymer electrolyte membrane, an elastomer frame 200 formed in the form of a sheet and bonded while being thermal bonded at the rim of the insert 100 in the outer area of the insert 100, having a reaction surface through-hole 201 in which the insert 100 is disposed formed therein, and having a plurality of frame manifold through-holes 210a, 210b through which the reactant gas flows or is discharged formed at both sides of the reaction surface through-hole 201, and a pair of separators 300a, 300b disposed on one surface and the other surface of the insert 100 and the elastomer frame 200 to supply the reactant gas. The elastomeric cell frame described in the present embodiment means that the insert 100 and the elastomer frame 200 are bonded while being thermal bonded. At this time, the area where the insert 100 is disposed in the elastomeric cell frame corresponds to the "reaction surface."

The insert 100 is an assembly of laminating the Membrane-Electrode Assembly 110 and a pair of gas diffusion layers 120a, 120b, and preferably, the gas diffusion layers 120a, 120b are disposed and laminated on one surface and the other surface of the Membrane-Electrode Assembly 110, respectively.

The Membrane-Electrode Assembly 110 is implemented as a general Membrane-Electrode Assembly composed of a polymer electrolyte membrane capable of transporting a hydrogen proton, and an electrode layer having a catalyst applied on both surfaces of the polymer electrolyte membrane so that hydrogen and oxygen may react, that is, a cathode and an anode.

The gas diffusion layers 120a, 120b are a means for passing through while diffusing the reactant gas flowing through the separators 300a, 300b to the Membrane-Electrode Assembly 110, and are formed of a base substrate solely or formed of the base substrate and a micro-porous layer (MPL) formed on one surface of the base substrate. In particular embodiments, materials of the base substrate and the micro-porous layer are implemented as a material applied to a general gas diffusion layer.

The elastomer frame 200 is a means that is integrally formed in the outer area of the insert 100 for maintaining the airtightness of the insert 100 and convenience in the laminating process, and the elastomer frame 200 is made of a Thermo Plastic Elastomer (TPE) for the bonding by the thermal bonding without a separate adhesive member while maintaining a predetermined shape. Here, the thermal bonding may be one of hot-press bonding, ultrasonic bonding, high frequency bonding, vibration bonding, infrared bonding, radiant-heat bonding, calendar bonding and laser bonding. In particular embodiments, the thermal bonding is preferably a hot-press bonding in which heat and pressure are easily provided.

The Thermo Plastic Elastomer (TPE) may be formed of a resin-based Hard-segment and a rubber-based Soft-segment. Therefore, the resin-based Hard-segment contributes to the thermal bonding of the elastomer frame 200, and the rubber-based Soft-segment contributes to the elasticity and maintaining the shape.

Therefore, styrene-based, olefin-based, urethane-based, amide-based, polyester-based or the like may be applied as the Thermo Plastic Elastomer (TPE), and preferably, a polyolefin-based Thermo Plastic Elastomer (TPE) may be applied. The resin-based Hard-segment may be made of a polyolefin resin such as PE or PP, and the rubber-based Soft-segment may be made of an olefin-based rubber such as Ethylene Propylene Diene Monomer Rubber (EPDM).

The elastomer frame 200 is disposed to surround any one surface of both surfaces of the rim of the insert 100 and the side surface thereof in the outer area of the insert 100, and is formed integrally by being thermal bonded at the interface thereof with the insert 100 exposed to any one surface of both surfaces of the rim of the insert wo and the side surface thereof. Here, the "outer area" of the insert 100 means an area including the edge area of the insert wo and a space of the surrounding thereof, and the "rim" of the insert wo means the edge area of the insert 100.

For example, as illustrated in FIG. 1, the elastomer frame 200 is disposed to surround the outer area of the insert wo while facing one surface of the rim of the insert wo and the side surface thereof.

In particular, the elastomer frame 200 may extend the interface with the insert wo for the airtight adhesion with the insert wo.

For example, the elastomer frame 200 is formed with a reaction surface through-hole 201 in which the insert 100 is disposed, and the inner circumferential surface of the reaction surface through-hole 201 is formed with a step part 202 for surrounding one surface and the side surface of the insert 100.

Therefore, a thermal bonding part by the thermal bonding is formed at each interface between the insert 100 and the elastomer frame 200, thereby implementing the solid bonding and the integration therebetween.

The elastomer frame 200 is formed with frame manifold through-holes 210a, 210b for forming a manifold for flowing the reactant gas and the coolant into the reaction surface formed by the insert 100 and discharging them.

For example, one side of the elastomer frame 200 is formed with a plurality of frame inflow manifold through-holes 210a into which the reactant gas and the coolant flow, and the other side thereof is formed with a plurality of frame discharge manifold through-holes 210b through which the reactant gas and the coolant are discharged.

The elastomer frame 200 may be formed with a means for the airtightness with a separator.

For example, one surface and the other surface of the elastomer frame 200 are formed with at least one protrusion seal 203 for surrounding the insert 100 along the outer area of the insert 100. In particular, the protrusion seal 203 is preferably formed in an area including a position corresponding to a position of a forming part 320 formed on a separator 300 to be described later. For example, the protrusion seal 203 is preferably formed to surround the insert 100 along the outer area of the insert 100 at the surface opposite to the surface, in which the elastomer frame 200 faces the separator 300, of both surfaces of the elastomer frame 200, and is preferably formed while its position includes the position corresponding to the position where the forming part 320 of the separator 300 has been formed.

The separator 300 (300a, 300b) is a means that is disposed on one surface and the other surface of the elastomeric cell frame composed of the insert 100 and the elastomer frame 200 to supply the reactant gas, and is made of a metal material.

The separator 300 is also formed with separator manifold through-holes 310a, 310b for forming a manifold for flowing and discharging the reactant gas and the coolant as in the elastomer frame 200.

For example, one side of the separator 300 is formed with the plurality of separator inflow manifold through-holes 310a to correspond to the plurality of frame inflow manifold through-holes 210a, and the other side thereof is formed with the plurality of separator discharge manifold through-holes 310b to correspond to the plurality of frame discharge manifold through-holes 210b.

Therefore, a flow path through which the reactant gas and the coolant flow is formed between the separator inflow manifold through-hole 310a and the separator discharge manifold through-hole 310b, that is, in the area where the reaction surface is formed. At this time, a diffusion part (not illustrated) formed with a flow path of the shape of diffusing the reactant gas may be formed between the separator inflow manifold through-hole 310a and the reaction surface.

A flow path through which the reactant gas flows is formed between the above-described elastomer frame 200 and the separator 300. In particular, an inlet flow path and an outlet flow path through which the reactant gas flows and is discharged are formed between the manifold and the reaction surface.

The present embodiment has formed a structure that forms a tunnel-shaped flow path in the separator and is formed so that the tunnel-shaped flow path formed on the separator 300 stably sits in the elastomer frame 200 in order to maintain the airtightness while stably securing the inlet flow path and the outlet flow path formed between the elastomer frame 200 and the separator 300.

Hereinafter, as illustrated in FIG. 2, the present embodiment will be described by taking the structures of the elastomer frame 200 and the separator 300 in the area corresponding to the inlet flow path as an example. Of course, these structures may also be applied to the area corresponding to the outlet flow path.

For example, at least any one surface of one surface and the other surface of the elastomer frame 200 is formed in plural with a plurality of flow path parts 220, through which the reactant gas flows between at least any one of the frame inflow manifold through-holes 210a and the reaction surface through-hole 201, to be spaced apart from each other. Further, the elastomer frame 200 has the protrusion 230 formed between the flow path parts 220 adjacent to each other. Therefore, the flow path part 220 and the protrusion 230 are alternately formed between the frame inflow manifold through-hole 210a and the reaction surface through-hole 201 along the width direction of the elastomer frame 200. The flow path part 220 and the protrusion 230 are formed in a direction from the frame inflow manifold through-hole 210a toward the reaction surface through-hole 201.

Further, the flow path part 220 formed in the elastomer frame 200 has a step part 221 formed at the height corresponding to the thickness of the separator 300. Therefore, the flow path part 220 is divided into an area having a relatively low height and an area having a relatively high height with respect to the step part 221.

The separator 300 is formed with a tunnel-shaped forming part 320 through which the reactant gas flows while overlapping the flow path part 220 formed in the elastomer frame 200. Further, the separator 300 has a mounting part 330 overlapping the protrusion 230 of the elastomer frame 200 formed between the forming parts 320 adjacent to each other. Therefore, the forming part 320 and the mounting part 330 are alternately formed between the separator inflow manifold through-hole 310a and the reaction surface area along the width direction of the separator 300.

In an embodiment, the forming part 320 of the separator 300 is formed by bending while protruding some areas of the separator 300 in one surface direction by the press molding. In particular, the separator 300 has the end portion of the area where the forming part 320 is formed at a predetermined length cut and the press molding is performed, and the forming part 320 is processed in a tunnel shape in which both ends communicate with each other. Therefore, a flow path hole 321 for communicating from the other surface area of the forming part 320 to one surface area of the separator 300 adjacent to the area where the forming part 320 has been formed by the forming part 320 formed in the tunnel shape is formed. Therefore, the reactant gas flows from the other surface area of the forming part 320 to the reaction surface, that is, the insert 100, through the flow path hole 321.

The forming part 320 of the separator 300 is formed to have the length corresponding to the area having the relatively low height with respect to the step part 221 of the flow path part 220 formed in the elastomer frame 200. Therefore, the forming part 320 of the separator 300 is seated in the area having the relatively low height of the flow path part 220 of the elastomer frame 200. As illustrated in FIG. 4B, since the step part 221 formed in the flow path part 220 of the elastomer frame 200 is formed at the height corresponding to the thickness of the separator 300, the height of the other surface of the forming part 320, that is, the surface is maintained to be the same as the area having the relatively high height of the flow path part 220, thereby smoothly flowing the reactant gas.

Further, in the present embodiment, the width of the protrusion 230 and the width of the mounting part 330 make a difference therebetween in order to prevent the protrusion 230 of the elastomer frame 200 from being excessively deformed while being compressed by the mounting part 330 of the separator 300 to release the airtightness at the time of laminating the elastomer frame 200 and the separator 300.

For example, as illustrated in FIG. 4A, the width of the protrusion 230 formed in the elastomer frame 200 is formed smaller than the width of the mounting part 330 formed in the separator 300, thereby forming so that the outside surface of the protrusion 230 and the inside surface of the mounting part 330, which face each other, in the case of laminating the elastomer frame 200 and the separator 300 to overlap each other, are spaced at a predetermined interval apart from each other. Therefore, if the elastomer frame 200 and the separator 300 are compressed while being laminated, it is possible to prevent the mounting part 330 of the separator 300 from being deformed by letting the deformation be within a space spaced between the protrusion 230 and the mounting part 330 even if the protrusion 230 of the elastomer frame 200 is compressed to some extent and therefore, to prevent the forming part 320 adjacent to the mounting part 330 from being deformed, thereby stably securing the flow path through which the reactant gas flows without deformation.

Further, as in FIGS. 2 and 3, the length of the protrusion 230 formed in the elastomer frame 200 may be formed longer than the length of the forming part 320 formed in the separator 300, thereby forming the flow path through which the reactant gas flows long enough. Therefore, the reactant gas may be induced to flow evenly in the desired direction.

While the present disclosure has been described with reference to the accompanying drawings and the above-described preferred embodiments, the present disclosure is not limited thereto, and is limited by the claims to be described later. Therefore, those skilled in the art may variously change and modify the present disclosure without departing from the technical spirit of the claims to be described later.

What is claimed is:

1. A unit cell for a fuel cell, the unit cell comprising:
   an insert comprising a Membrane-Electrode Assembly having a first pair of electrode layers formed on a first surface of a polymer electrolyte membrane and a second pair of electrode layers formed on a second surface of the polymer electrolyte membrane;
   an elastomer frame formed in a sheet shape and bonded at a rim of the insert in an outer area of the insert, the elastomer frame having a reaction surface through-hole in which the insert is disposed formed therein and having a plurality of frame manifold through-holes, through which a reactant gas can flow or be discharged, formed at both sides of and spaced apart from the reaction surface through-hole; and
   a pair of separators, each separator disposed on a respective side of the insert and the elastomer frame, the pair of separators configured to supply the reactant gas;
   wherein at least one surface of the elastomer frame includes a plurality of flow path parts through which the reactant gas can flow, at least one of the plurality of flow path parts being disposed between ones of the plurality of frame manifold through-holes; and
   wherein at least one of the separators includes a tunnel-shaped forming part overlapping at least one of the flow path parts, the tunnel-shaped forming part being configured to allow the reactant gas to flow therethrough.

2. The unit cell for the fuel cell according to claim 1, wherein:
   the plurality of flow path parts formed in the elastomer frame each include a step part at a height corresponding to a thickness of at least one of the separators; and
   the forming part of the at least one of the separators is seated in an area having a relatively low height with respect to the step part of the plurality of flow path parts.

3. The unit cell for the fuel cell according to claim 2, wherein a surface height of the forming part corresponds to a height of an area having a relatively high height with respect to the step part of the plurality of flow path pails.

4. The unit cell for the fuel cell according to claim 1, wherein:
   the elastomer frame has a protrusion formed between adjacent ones of the flow path parts; and
   at least one of the separators has a mounting part overlapping the protrusion.

5. The unit cell for the fuel cell according to claim 4, wherein a width of the protrusion is smaller than a width of the mounting part so that an outside surface of the protrusion and an inside surface of the mounting part, which face each other, are spaced at a predetermined interval apart from each other.

6. The unit cell for the fuel cell according to claim 4, wherein a length of the protrusion is longer than a length of the forming part of the at least one of the separators.

7. The unit cell for the fuel cell according to claim 1, wherein the forming part of the at least one of the separators is formed to be bent while being protruded in one surface direction of the separator, and a flow path hole is formed for communicating from a first surface area of the forming part to a first surface area of the separator adjacent to an area where the forming part has been formed, wherein the unit cell for the fuel cell is configured to allow the reactant gas to flow from the first surface area of the forming part into the insert through the flow path hole.

8. The unit cell for the fuel cell according to claim 1, wherein the elastomer frame further comprises at least one protrusion seal configured to surround the insert along the outer area of the insert, and wherein the protrusion seal is formed in an area corresponding to a position where the forming part of the at least one of the separators has been formed.

9. A unit cell for a fuel cell, the unit cell comprising:
   an elastomer frame, the elastomer frame comprising:
      a reaction surface through-hole;
      a plurality of frame manifold through-holes disposed at both ends of and spaced apart from the reaction surface through-hole; and
      a plurality of flow path parts on a first surface or a second surface of the elastomer frame;
   an insert comprising a Membrane-Electrode Assembly, wherein the insert is disposed in the reaction surface through-hole, and wherein a rim of the insert is thermal bonded to the elastomer frame; and
   a pair of separators comprising a first separator disposed on the first surface of the elastomer frame and a second separator disposed on the second surface of the elastomer frame, wherein at least one of separators includes a plurality of tunnel-shaped forming parts configured to overlap the plurality of flow path parts.

10. The unit cell for the fuel cell according to claim 9, wherein the Membrane-Electrode Assembly comprises a polymer electrolyte membrane and a pair of electrode layers, wherein the polymer electrolyte membrane has a first primary surface and a second primary surface, and wherein a first one of the pair of electrode layers is disposed on the first primary surface and a second one of the pair of electrode layers is disposed on the second primary surface.

11. The unit cell for the fuel cell according to claim 9, wherein:
   at least one of the plurality of flow path parts includes a step part at a height corresponding to a thickness of at least one of the separators; and
   at least one of the plurality of tunnel-shaped forming parts is seated in an area having a relatively low height with respect to the step part of the at least one of the plurality of flow path parts.

12. The unit cell for the fuel cell according to claim 11, wherein a surface height of the at least one of the plurality of tunnel-shaped forming parts corresponds to a height of an area having a relatively high height with respect to the step part of the at least one of the plurality of flow path parts.

13. The unit cell for the fuel cell according to claim 9, wherein:
   the elastomer frame further comprises a protrusion formed between adjacent ones of the plurality of flow path parts; and
   at least one of the separators comprises a mounting part, wherein the mounting part overlaps the protrusion.

14. The unit cell for the fuel cell according to claim 13, wherein a width of the protrusion is smaller than a width of the mounting part so that an outside surface of the protrusion and an inside surface of the mounting part, which face each other, are spaced at a predetermined interval apart from each other.

15. The unit cell for the fuel cell according to claim 13, wherein a length of the protrusion is longer than a length of at least one of the plurality of tunnel-shaped forming parts.

16. The unit cell for the fuel cell according to claim 9, wherein the elastomer frame further comprises at least one protrusion seal configured to surround the insert along an outer area of the insert, and wherein the protrusion seal is formed in an area corresponding to a position of at least one of the plurality of tunnel-shaped forming parts.

* * * * *

UNITED STATES PATENT AND TRADEMARK OFFICE
CERTIFICATE OF CORRECTION

Page 1 of 1

PATENT NO. : 11,171,340 B2
APPLICATION NO. : 16/869971
DATED : November 9, 2021
INVENTOR(S) : Jin Hyeok Yoo It is certified that error appears in the above-identified patent and that said Letters Patent is hereby corrected as shown below:

In the Claims

Claim 3, Column 8, Line 58; delete "flow path pails." and insert --flow path parts.--.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*